US006814102B2

(12) United States Patent  (10) Patent No.: US 6,814,102 B2
Hess et al.  (45) Date of Patent: Nov. 9, 2004

(54) VALVE COMPRISING ELASTIC SEALING ELEMENTS

(75) Inventors: Juergen Hess, Baden-Baden (DE); Georg Reeb, Buehl Einsental (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/030,281

(22) PCT Filed: Feb. 21, 2001

(86) PCT No.: PCT/DE01/00652

§ 371 (c)(1),
(2), (4) Date: Mar. 15, 2002

(87) PCT Pub. No.: WO01/88422

PCT Pub. Date: Nov. 22, 2001

(65) Prior Publication Data

US 2002/0104571 A1 Aug. 8, 2002

(30) Foreign Application Priority Data

May 13, 2000 (DE) .......................... 100 23 582

(51) Int. Cl.$^7$ ............................................. F16K 11/04
(52) U.S. Cl. .............................. 137/625.5; 137/315.09; 137/315.27
(58) Field of Search .......................... 137/625.48, 625.5, 137/315.09, 315.27, 223, 233; 251/318, 364

(56) References Cited

U.S. PATENT DOCUMENTS 2,106,638 A * 1/1938 Hillier ........................ 137/223
2,154,255 A * 4/1939 Williams ................ 137/315.27
2,240,129 A * 4/1941 Broecker ..................... 137/223
4,846,442 A * 7/1989 Clarkson et al. ............. 251/328
5,085,241 A   2/1992 Mieth
5,564,458 A  10/1996 Roth et al.
5,645,100 A * 7/1997 Chuang et al. .............. 137/223
5,960,815 A * 10/1999 Wang ..................... 137/118.03

FOREIGN PATENT DOCUMENTS

DE       542 464 C     8/1933
DE     195 44 984 A    6/1996
DE     197 53 575 A    6/1999
FR      2 044 401 A    2/1971

* cited by examiner

*Primary Examiner*—John Fox
(74) *Attorney, Agent, or Firm*—Michael J. Striker

(57) ABSTRACT

The invention relates to a valve (10, 110) having a valve chamber (14, 114), having at least one inlet conduit (16, 116) and one outlet conduit (18, 118), furthermore having a movable lifting rod (34, 134), one end of which opens into an actuator (53), and having at least one valve member (36, 136, 236) secured to the lifting rod (34, 134), and having at least one valve seat (22, 122) cooperating with the valve member (36, 136, 236).

Figure 1:
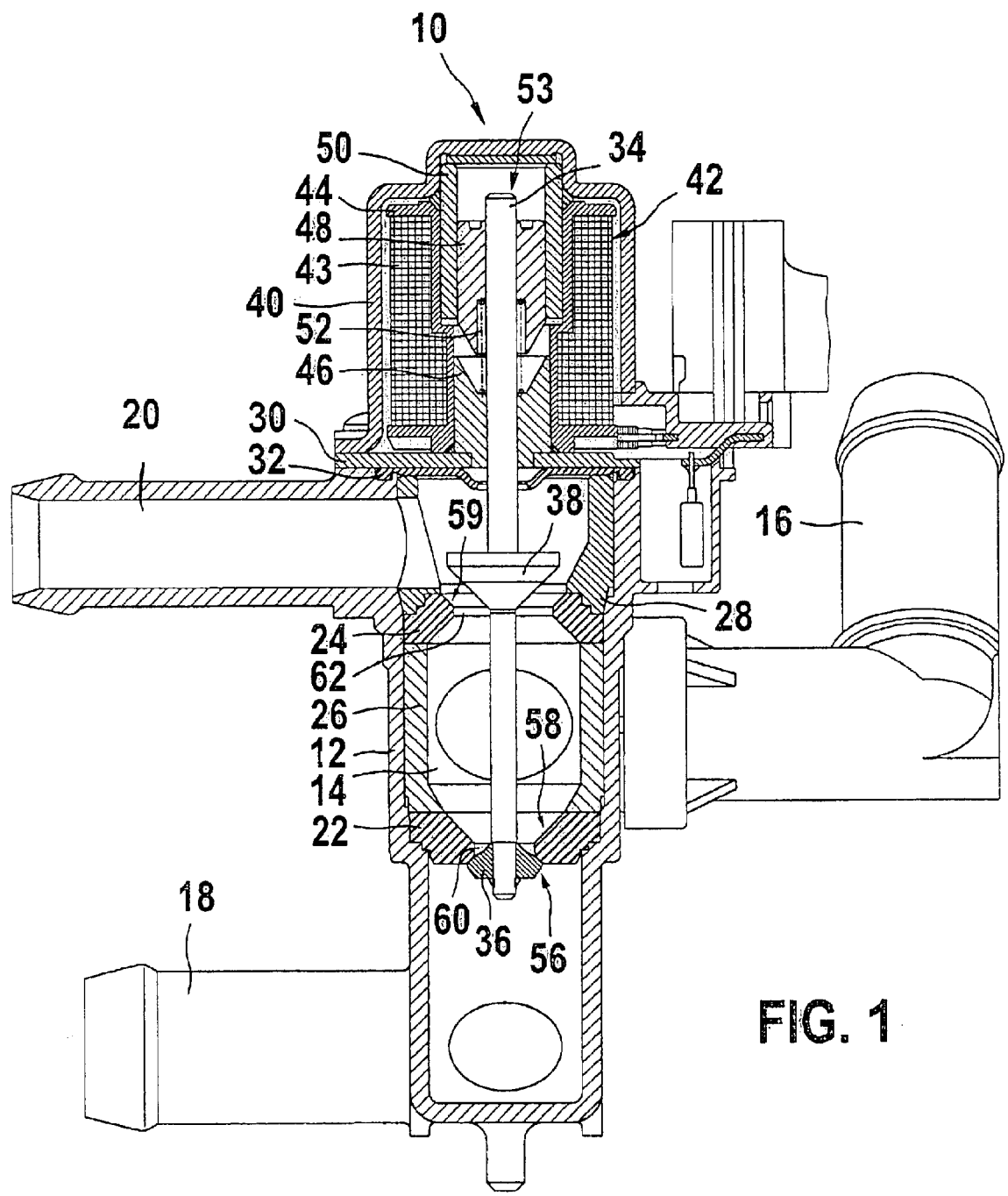

It is proposed that the valve seat (22, 122) and/or valve member (36, 136, 236) is elastically deformable in such a way that the elasticity of the valve seat (22, 122) and/or valve member (36, 136, 236) is at least so great that the valve member (36, 136, 236) can be thrust through the valve seat (22, 122) by an in particular external exertion of force and that the valve seat (36, 136, 236) and the valve member (22, 122) return to their outset state.

17 Claims, 5 Drawing Sheets

VALVE COMPRISING ELASTIC SEALING ELEMENTS

PRIOR ART

The invention is based on a valve as generically defined by the preamble to the independent claim.

Such valves are known, for instance from German Patent Disclosure DE 197 53 575 A1. The valve described in DE 197 53 575 A1 is a magnetic bypass valve for a liquid-regulated heating or cooling system. Two valve members secured to a lifting rod of the valve regulate the flow between an inlet conduit and two outlet conduits, and one of these outlet conduits takes on the function of a bypass conduit in the heating and cooling cycle. A disadvantage of the valve described in DE 197 53 575 A1 and of all comparable valves is—for reasons of construction—the quite complex assembly of the individual components of the valve. First the sealing rings, which form the valve seats of the valve chamber, and a spacer sleeve that defines the actual valve chamber of the valve have to be thrust onto the lifting rod of the valve. After that, a first valve member, the bypass valve member, can be mounted on the lifting rod and secured to the lifting rod with a securing shim. This preassembled unit comprising the lifting rod, bypass valve member, valve seats and spacer element is thrust into the valve housing, and the individual components are placed in their position. After that, a further spacer sleeve for affixing the valve chamber must be introduced into the valve housing, and only after that can the second valve member, for monitoring the useful outlet, be secured to the lifting rod.

This described assembly is inconvenient, complicated and thus expensive. Furthermore, the fastening of the valve members to the lifting rod must be secured in a complicated way by means of a groove in the lifting rod and one additional securing shim.

ADVANTAGES OF THE INVENTION

The valve according to the invention having the characteristics of the main claim has the advantage of enabling faster, better assembly in the manufacture of valves. The sequence of assembly becomes virtually independent of the instant of installation of the lifting rod in the valve housing, since the lifting rod, with the valve members fixedly mounted on it, can even be introduced later on into the valve chamber. An elastic stretchability of the sealing elements, that is, of the valve seat and/or valve member, assures that the valve member can be led through the applicable valve seat by some exertion of force from outside, and when the valve is in operation the sealing elements have by then resumed their original shape, so that the valve chamber is securely sealed off in the desired way. The requisite force expenditure for pressing the valve member through a valve seat can be exerted from outside; however, it is also conceivable for this expenditure of force to be brought to bear by actuators, optionally triggered in an amplified way, that cooperate with the valve members.

By the provisions recited in the other claims, advantageous refinements of and improvements to the valve defined by claim 1 are possible.

Suitably shaped valve members and valve seats make it possible to press the lifting rod through the valve chamber more easily. By the embodiment of a chamfer on the side of the valve member remote from the associated valve seat, which side extends relative to the axis of the lifting rod, and a corresponding chamfer of the same inclination on the side of the associated valve seat remote from the valve member, it is attained that the valve member can be passed more easily through the valve seat.

Material comprising the valve seat or the valve member can be received during the passing of the valve member through the valve seat in recesses embodied in the lifting rod, valve member or the associated valve seat, thus making it easier to pass the valve member through the valve seat. In valve operation, the sealing elements have resumed their original shape, so that the valve chamber is securely sealed off in the desired way.

It is also possible, by means of a chemical treatment of the sealing surfaces of the valve member and valve seat with a lubricant, to minimize a sliding friction that occurs while the valve member is being passed through the valve seat.

The valve according to the invention in particular enables preassembly of the valve chamber of valves, of the type described in DE 197 53 575 A1: The sealing rings, which form the valve seats, and the spacer sleeve that embodies the actual valve chamber can already be installed in the valve housing before the lifting rod is installed.

Only the valve members are mounted on the lifting rod itself. The valve members are press-fitted, for example, onto the lifting rod as they always have, at the desired point, and are optionally additionally calked for the sake of security with material comprising the lifting rod. The calking offers a simple, reliable way of securing the valve members to the lifting rod. The lifting rod thus mounted outside the valve housing, with its valve members secured to it, can then be inserted through the valve chamber into the preassembled valve housing, because of the elasticity of the valve seat and the valve member.

The lifting rod of the valve of the invention can be produced for example from a plastic as well. This lowers the cost for material on the one hand and on the other has the advantage that the valve members can be welded directly into the lifting rod, which in turn means a substantial simplification in assembling the valves.

The valve of the invention thus makes a modified, faster assembly possible and thus results in improved quantity and reduced costs in the production of the valve.

DRAWING

Three exemplary embodiments of the invention are shown in the drawing and will be described in further detail in the ensuing description.

Figure 2:
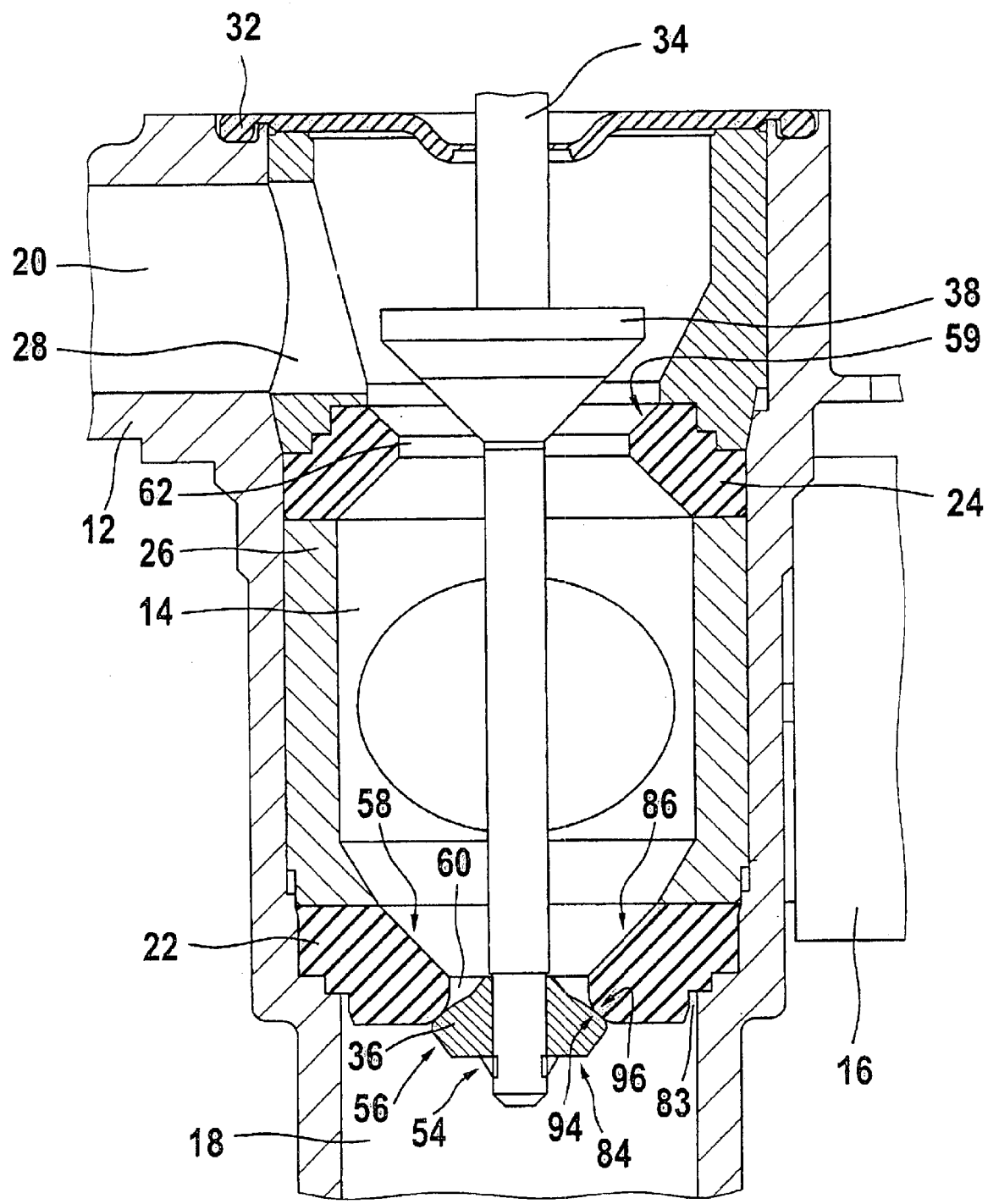
Figure 3:
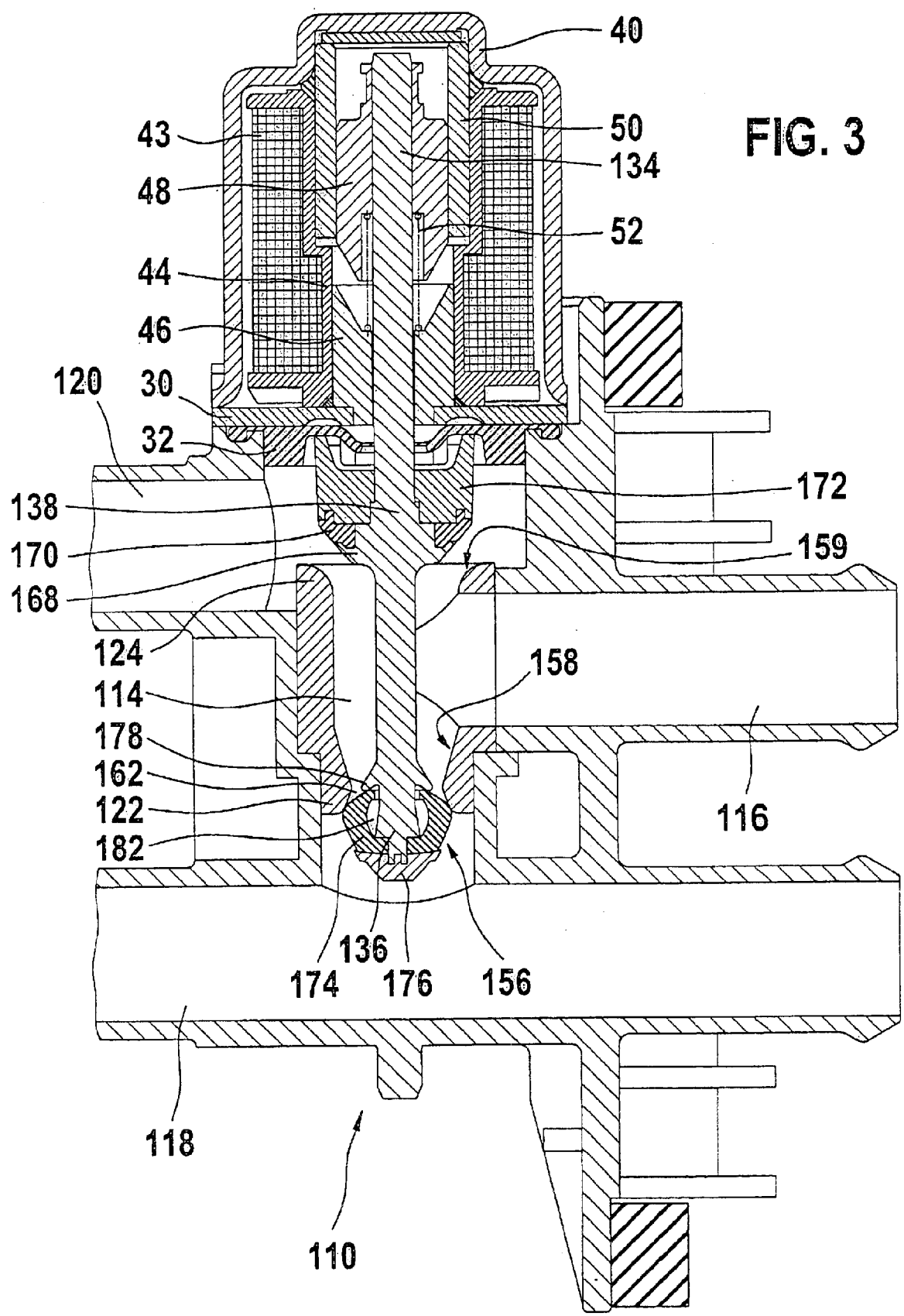
Figure 4:
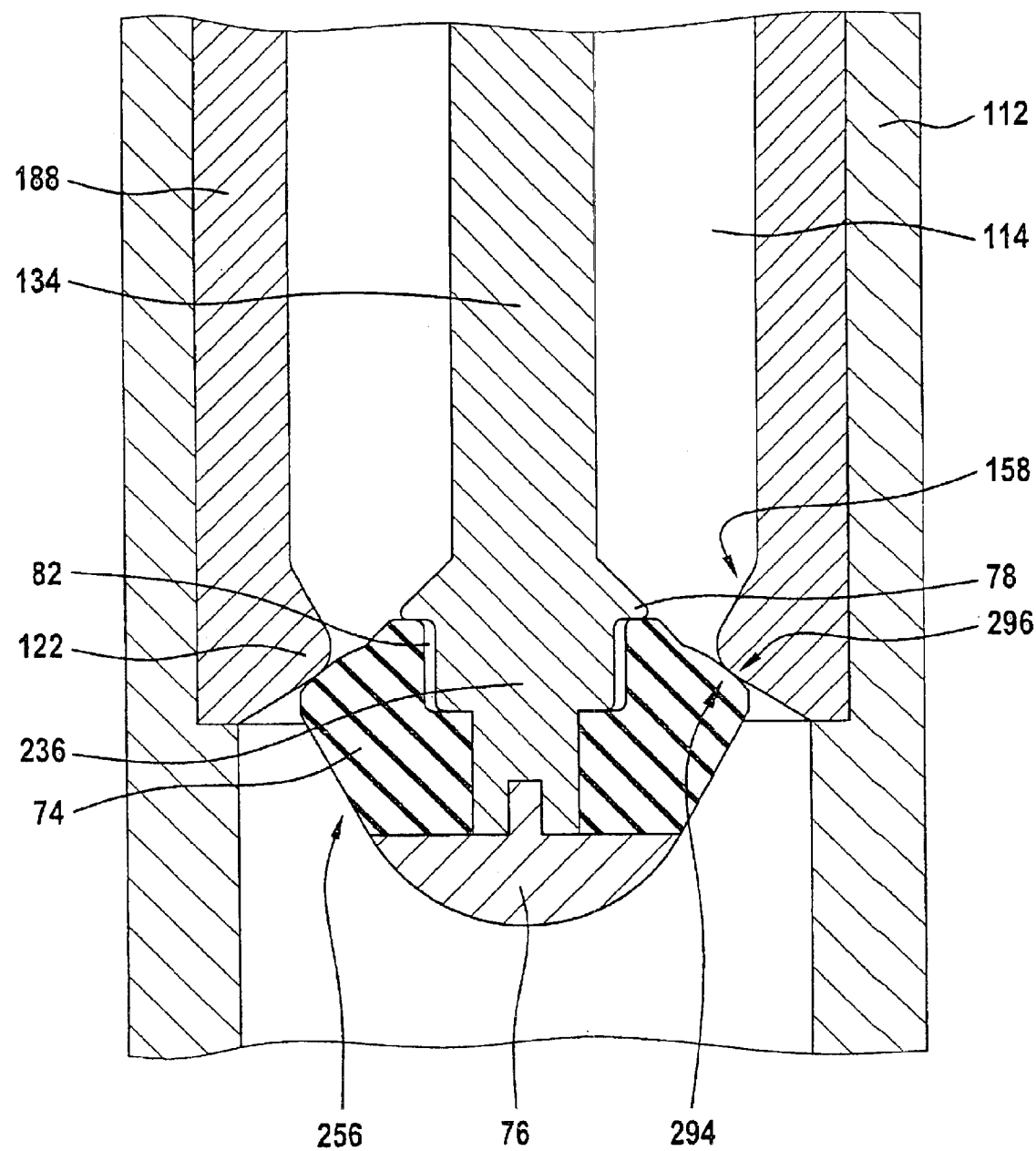
Figure 5:
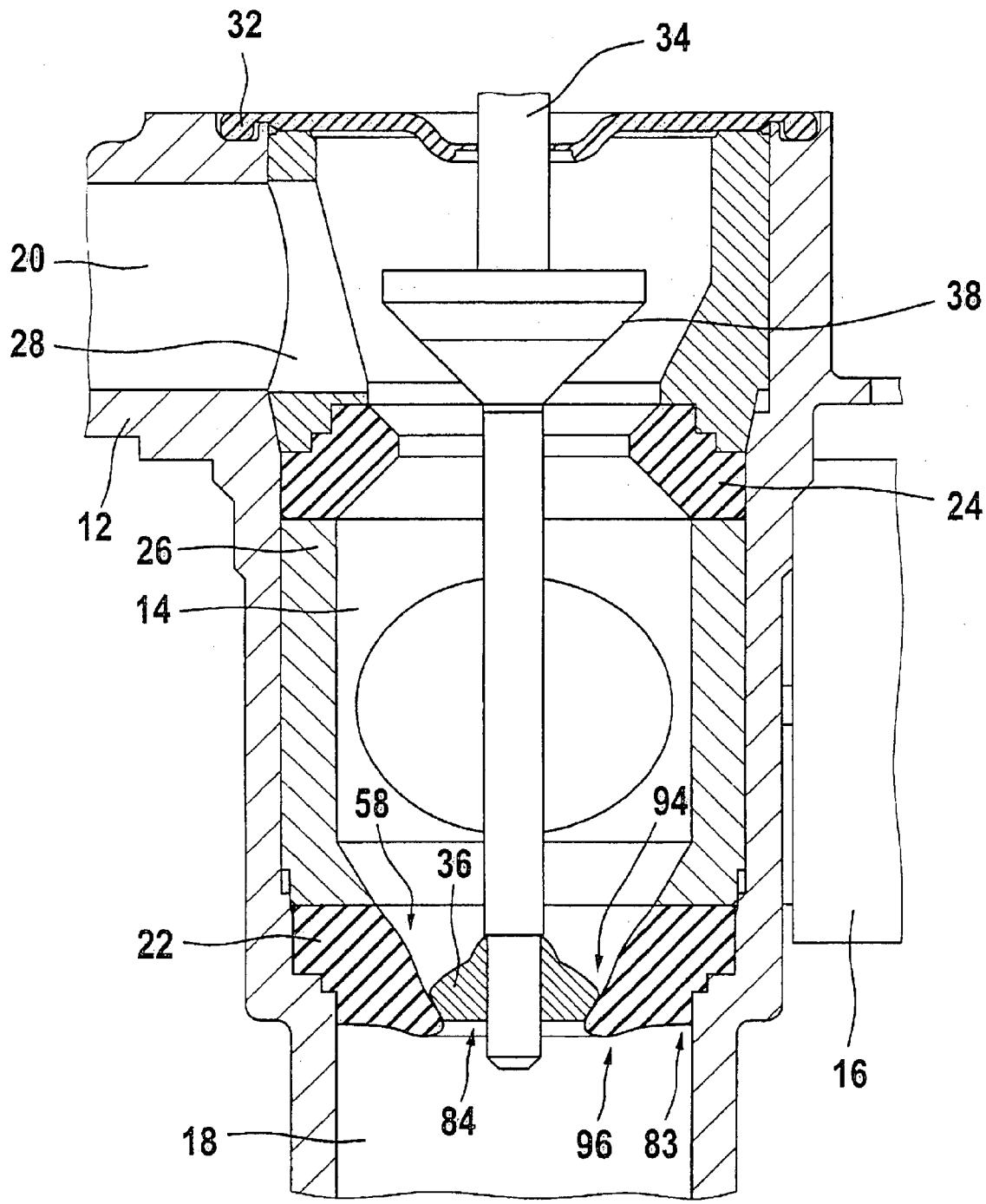

Shown are:

FIG. 1, a cross section through a valve of the invention in accordance with the first exemplary embodiment;

FIG. 2, an enlarged detail of FIG. 1;

FIG. 3, a cross section through an alternative version, according to the invention, of a valve in accordance with the second exemplary embodiment;

FIG. 4, a variant according to the invention, in an enlarged detail of FIG. 3; and FIG. 5, a detail of FIG. 2, during the assembly of the valve.

DESCRIPTION OF THE EXEMPLARY EMBODIMENTS

The valve 10 according to the invention, shown in cross section in FIGS. 1 and 2, has a valve housing 12, which has a valve chamber 14, leading into which are an inlet conduit 16, a first outlet conduit 18, and a second outlet conduit 20.

The valve chamber 14 is inserted into the valve housing 12 and is formed by one valve seat 22—at the bottom in FIG. 1 or FIG. 2—facing the first outlet 18; one valve seat 24—at the top in FIG. 1 or FIG. 2—facing toward the second outlet conduit 20; and one spacer sleeve 26, disposed between these two sealing elements, which defines the actual volume of the valve chamber 14. The valve chamber 14 of the valve 10 can thus be replaced, and the valve 10 can thus be adapted more easily to special applications. The valve seats 22 and 24 of the valve chamber 14 are of an elastically stretchable material in this exemplary embodiment, such as NBR (nitrile butadiene rubber) and each have a respective valve opening 60 and 62. The valve chamber 14 is fixed in the valve housing 12 by a further spacer sleeve 28. To that end, the spacer sleeve 28 is braced on the one hand on the upper valve seat 24 of the valve chamber 14 and on the other on a support wall 30, which is secured to the valve housing 12. Located between the support wall 30 and the spacer sleeve 28 is a seal 32, which is placed in the valve housing 12. The outlet conduit 20, which discharges into the spacer sleeve 28, communicates with the valve chamber 14 via a valve member 38 and the associated valve seat 24.

A lifting rod 341 which carries the valve member 38 and, on its end toward the first outlet conduit 18, a second valve member 36—which in FIG. 1 or FIG. 2 is the lower valve member—leads through the valve chamber 14. The valve member 36 cooperates with the valve seat 22 of the valve chamber 14 and controls the first outlet conduit 18. This outlet conduit is for instance closed—as shown in FIG. 2—when a sealing face 94 of the valve member 36 presses against a sealing face 96 of the valve seat 22. In the version described here of the valve 10 according to the invention, the valve members 36 and 38 are made from plastic or from some other rigid material, such as brass. Using brass for the valve members 36 and 38 has the advantage, among others, of enhanced mechanical stability of the valve members. The inlet conduit 16 discharges into the valve chamber 14 between the two valve seats 22 and 24.

FIG. 5, in a detail of FIG. 2, shows the valve member 36 of the valve 10 in an intermediate position during assembly. For assembling the valve 10, the lifting rod 34, with the valve members 36 and 38 secured to it previously, is thrust through the valve chamber 14 that has been inserted into the valve housing 12. To that end, the elastic material of the valve seats 22 and 24 is stretched and forced apart by the rigid valve member 36. A gaplike expansion region 83 between the valve housing 12 and the valve seats 22 and 24 is closed in this exemplary embodiment while the valve member 36 is being forced through the valve seats 22 and 24. Through the thus-widened valve openings 62 and 60, it is possible to thrust the valve member 36. Once the valve member 36 has been forced through the valve seats 22 and 24, these seats resume their initial shape, because of their elasticity. The valve members 36 and 38, together with the associated valve seats 22 and 24, respectively, can then seal off the valve chamber 14 in the desired way during operation of the valve 10, because for example the sealing face 96 of the valve seat 22 comes to rest on the sealing face 94 of the valve member 36 and closes the first outlet conduit 18.

In the version of the valve according to the invention, the valve member 36 is calked against the lifting rod 34, in that material 54 comprising the lifting rod 34 is forced against the valve member 36. The valve member 36—as can be seen from the enlarged detail in FIG. 2—has a chamfer 56, on the side of its circumference remote from the valve seat 22, that corresponds to a chamfer 58 on the side of the valve seat 22 remote from the valve member 36 and to a chamfer 59 on the side of the valve seat 24 from the valve member 36. The chamfers 56, 58 and 59 have approximately the same inclination and make it easier to pass the lifting rod 34, with the valve members 36 and 38 secured to it, through the valve chamber 14 upon assembly. Guided by the chamfers 56, 58 and 59, the elastic material of the valve seats 22 and 24 is stretched and thus forced apart, so that the valve member 36 can be pressed through the widened valve openings 60 and 62. To minimize any sliding friction that occurs while the valve member 36 is being forced through the valve seats 22 and 24, the surface 84 of the valve member 36 and the surface 86 of the valve seat 22 are provided with a lubricant.

In the exemplary embodiment shown in FIG. 1 and FIG. 2, the valve opening 62 of the valve seat 24 is dimensioned as large enough that the valve member 36 can be passed through this opening without any expenditure of force. However, it is not always possible to realize such a configuration, so that in other versions of the valve 10 according to the invention, the valve member 36 is also pressed with an expenditure of force through the valve seat 24.

The upper end of the lifting rod 34 is extended out of the valve housing 12 through the seal 32, which rests on the lifting rod 34, and through the support wall 30 and discharges into a coil housing 40.

An electromagnetic coil 42 with windings 43 on a coil holder 44 and a magnet core 46 are located in the coil housing 40. The end of the lifting rod 34 that is passed into the coil housing carries an armature 48, which is solidly connected to the lifting rod 34 and is movable axially together with it in an armature guide 50 in the interior of the coil 42. Valve springs 52, which act counter to the magnet core 46 of the coil 42, are mounted on the armature 48. The armature 48 and the lifting rod 34 fixed in it are surrounded by the windings 43 of the coil 42. In this exemplary embodiment of the valve of the invention, the electromagnetic coil 42, in conjunction with an electric current flowing through the windings 43 of the coil 42 and in conjunction with the armature secured to the lifting rod 34, forms an actuator 53, which moves the lifting rod 34 of the valve 10. Depending on the current flow through the coil 42, the armature 48 in the armature guide 50, and thus the lifting rod 34 secured to the armature, together with the valve members 36 and 38, assume different switching positions in the valve.

The end toward the armature of the lifting rod 34 and the coil 42 surrounding this end are protected from the outside by the coil housing 40. The coil housing 40 is secured to the valve housing 12 via the support wall 30.

FIG. 3 shows an alternative version of the valve of the invention in cross section.

The valve 110, which is essentially the same in function, again involves a magnet valve with an inlet conduit 116, a first outlet conduit 118, and a second outlet conduit 120, which communicate via a valve chamber 114 in the valve housing 112. In contrast to the possible embodiment of the valve 10 of the invention shown in FIGS. 1 and 2, in this example the walls 188 of the valve chamber 114, including the valve seats 122 and 124, are produced integrally of a rigid material—in this case plastic.

A lifting rod 134, which in this exemplary embodiment again comprises plastic, has, outside the valve chamber 114 in the region of the outlet conduit 120, a platelike widened portion 168, which carries an elastic sealing ring 170. The sealing ring 170 is clamped between the platelike widened portion 168 of the lifting rod 134 and a spacer piece 172, which is likewise secured to the lifting rod 134. The platelike widened portion 168, the sealing ring 170 and the spacer piece 172 form the valve member 138 of the second outlet conduit 120, in this version according to the invention of the valve 110.

The end toward the first outlet conduit 118 of the lifting rod 134 carries a sealing member 174, which can be made from an elastic material, which in this exemplary embodiment is known as FKM (fluorocarbon rubber). However, it is also possible to use a rigid plastic material. The sealing member 174 is resiliently joined to the lifting rod 134 via a head piece 176. For that purpose, on one end—the lower end in FIG. 4—the sealing member 174 is solidly joined to the head piece 176 of the lifting rod 134, but not to the lifting rod 134 itself. The sealing member 174 gripping the lifting rod is movable radially to the lifting rod 134 and is secured in this direction by a collar 178 extending around the lifting rod 134. The sealing member 174, encompassing collar 178, and head piece 176 form the valve member 136 in this exemplary embodiment.

The valve member 136, on its side remote from the valve chamber 114, likewise has a chamfer 156 relative to the axis of the lifting rod 134; this chamfer corresponds to a chamfer 158 of the valve seat 122, on the side remote from the valve member 136, and to a chamfer 159, on the side of the valve seat 124 remote from the valve chamber 114. The chamfers 156, 158 and 159 have approximately the same inclination. The valve seat 122 in this exemplary embodiment is formed by a narrowing of the diameter of the valve chamber 114, on the side of the valve chamber 114 toward the first outlet conduit 118.

In the assembly of the valve 110, the lifting rod 134, with the valve members 136 and 138 mounted on it, is thrust through the rigid valve seats 122 and 124 of the valve chamber 114. The shape of the sealing member 174 is designed such that it can be compressed resiliently until it contacts the lifting rod 134 and has thus reduced its radial length. In the process, the sealing member 174—guided by the corresponding chamfers 156, 158 and 159—is pressed into the recess 182 between the head piece 176 and the encompassing collar 178 of the lifting rod 134. A lubricant on the corresponding chamfers 156, 158 and 159 once again makes it easier to force the valve member 136 through the valve seats 122 and 124, which in this exemplary embodiment are rigid. After the valve member 136 has been forced through, the sealing member 174 spreads away from the lifting rod 134 again and, together with the valve seat 122, seals off the outlet-side opening 162 of the valve chamber 114. In this exemplary embodiment of the valve 110 according to the invention, the requisite elasticity of the sealing elements is accordingly determined essentially by the elastic formed of the valve 136.

A further variant of the valve 110 of the invention is shown as a detail in FIG. 4. This shows a part of the valve housing 112 with the valve chamber 114 and the valve seat 122. The valve seat 122, on its side remote from the valve member 236, again has a chamfer 158, relative to the axis of the lifting rod, that corresponds to a chamfer 255 on the side of the valve member 236 remote from the valve seat 122. In this exemplary embodiment, the lifting rod 134 has a sealing member 74 and, on its end toward the sealing member 74, a head piece 76. The sealing member 74 is secured on one end—the lower end in FIG. 4—to the lifting rod 134 and the head piece 76, in such a way that the sealing member 74 can be compressed resiliently and conforms, guided by a collar 78 extending on the lifting rod 134, to the lifting rod 134. The sealing member 74, encompassing collar 78 and head piece 76 in this exemplary embodiment form the valve member 236.

In the assembly of this variant of the valve 110, the lifting rod 134, again with the already pre-mounted valve members 236 and 138—the latter not visible in FIG. 4—is thrust through the valve seats 122 and 124 of the valve chamber 114. The shape and material of the sealing member 74 are selected such that when the valve member 236 is forced through the valve seats 122 and 124, which in this exemplary embodiment are rigid, the sealing member 74 is compressed elastically and additionally presses resiliently against the lifting rod 134. In the process, guided by the corresponding chamfers 256, 158 and 159, the sealing member 74 is pressed into the recess 82 between the head piece 76 and the encompassing collar 78 of the valve member 236. Once again, a lubricant on the corresponding chamfers 256, 158 and 159 makes it easier to force the valve member 236 through the rigid valve seats 122 and 124. After being forced through, the sealing member 174 resumes its original form and position in the valve member 236 and can be pulled with its sealing face 294 against the sealing face 296 of the valve seat 122. In this exemplary embodiment of the valve 110 of the invention, the requisite elasticity of the sealing elements is accordingly determined by both the shape and the material of the valve member 236.

The invention is not limited to the exemplary embodiments described of an electromagnetic valve with two valve members.

It can equally advantageously be achieved in a valve which has only one outlet conduit and thus carries only one valve member on the lifting rod. The valve according to the invention is equally not limited to the use of an electromagnetic actuator. The valve housing in turn requires no special valve chamber. Instead, the valve chamber can be formed by the valve housing itself.

The valve of the invention is not limited to the use of the elastic materials named in the exemplary embodiments. Among others, the following are possible materials for the sealing elements:

nitrile butadiene rubber (NBR), hydrogenated nitrile butadiene rubber (HNBR), hydrogenated nitrile butadiene rubber, with the addition of PTFE to reduce friction (HNBR+PTFE), fluorocarbon rubber (FKM), and ethylene propylene diene rubber plus a lubricant (EPDM+lubricant).

What is claimed is:

1. A valve (10, 110) having a valve chamber (14, 114), having at least one inlet conduit (16, 116) and one outlet conduit (18, 118) branching off from the valve chamber, having a movable lifting rod (34, 134), one end of which opens into an actuator (53), and having at least one valve member (36, 136, 236) secured to the lifting rod (34, 134), and having at least one valve seat (22, 122) cooperating with the valve member (36, 136, 236), characterized in that the valve seat (22, 122) and/or valve member (36, 136, 236) is elastically deformable, and that the elasticity of the valve seat (22, 122) and/or valve member (36, 136, 236) is at least so great that the valve member (36, 136, 236) can be thrust through the valve seat (22, 122) by what is in particular an external exertion of force and subsequently the valve seat (36, 136, 236) and the valve member (22, 122) return to their outset state, wherein the valve has a magnetic actuator (53).

2. The valve (10, 110) of claim 1, wherein the at least one valve seat (22, 122) and the associated at least one valve member (36, 136, 236) have a chamfer (58, 158 and 56, 156, 256) relative to the axis of the lifting rod (34, 134), which chamfers correspond to one another.

3. The valve (10, 110) of claim 1, wherein the elasticity of the valve seat (22, 122) and/or valve member (36, 136, 236) is produced by means of the elastic properties of the material used and/or by the specially designed shape of the valve seat (22, 122) and/or of the valve member (36, 136, 236).

4. The valve (10, 110) of claim 3, wherein recesses (82, 182) are located in the valve seat (22, 122) and/or in the valve member (36, 136, 236), which recesses are capable of receiving elastic material comprising the valve seat (22, 122) and/or the valve member (36, 136, 236) while the valve member (36, 136, 236) is being led through the valve seat (22, 122).

5. The valve (10, 110) of claim 1, wherein the at least one valve member (36, 136, 236) of the valve (10, 110) is calked at the lifting rod (34, 134).

6. The valve (10, 110) of claim 1, wherein the lifting rod (34, 134) is made from plastic.

7. The valve (10, 110) of claim 6, wherein the valve members (36, 136 and 38, 138) are welded directly into the lifting rod (34, 134).

8. The valve (10, 110) of claim 1, wherein the valve chamber (14, 114) is hollowed out integrally.

9. The valve (10, 110) of claim 1, wherein he valve (10, 110) is part of the water-associated control of the cycle of a heating or cooling system.

10. The valve (10, 110) of claim 1, wherein the at least one valve seat (22, 122) and the associated at least one valve member (36, 136, 236) have a chamfer (58, 158 and 56, 156, 256) relative to the is of the lifting rod (34, 134), which chamfers correspond to one another.

11. The valve (10, 110) of claim 1, wherein the valve member (36, 136, 236) is elastic, while the valve seat (22, 122) is substantially rigid.

12. A valve (10, 110) having a valve chamber (14, 114), having at least one inlet conduit (16, 116) end one outlet conduit (18, 118) branching off from the valve chamber, having a movable lifting rod (34, 134), one end of which ovens into an actuator (53), and having at least one valve member (36, 136, 236) secured to the lifting rod (34, 134), and having at least one valve seat (22, 122) cooperating with the valve member (36, 136, 236), characterized in that the valve seat (22, 122) and/or valve member (36, 136, 236) is elastically deformable, and that the elasticity of the valve seat (22, 122) and/or valve member (36, 136, 236) is at least so great that the valve member (36, 136, 236) can be thrust through the valve seat (22, 122) by what is in particular an external exertion of force and subsequently the valve seat (36, 136, 236) and the valve member (22, 122) return to their outset state, wherein the surfaces (86, 186 and 84, 184) of the valve seat (22, 122) and/or of the valve member (36, 136, 236) are treated with a lubricant, which reduces a sliding friction that occurs while the valve member (36, 136, 236) is being led through the valve seat (22, 122).

13. A valve (10, 110) having a valve chamber (14, 114), having at least one inlet conduit (16, 116) and one outlet conduit (18, 118) branching off from the valve chamber, having a movable lifting rod (34, 134), one end of which opens into an actuator (53), and having at least one valve member (36, 136, 236) secured to the lifting rod (34, 134), and having at least one valve seat (22, 122) cooperating with the valve member (36, 136, 236), characterized in that the valve seat (22, 122) and/or valve member (36, 136, 236) is elastically deformable, and that the elasticity of the valve seat (22, 122) and/or valve member (36, 136, 236) is at least so great that the valve member (36, 136, 236) can be thrust through the valve seat (22, 122) by what is in particular an external exertion of force and subsequently the valve seat (36, 136, 236) and the valve member (22, 122) return to their outset state, wherein a second valve member (38, 128) is mounted on the lifting rod (34, 134), on the side of the at least one valve member (36, 136, 236) opposite the at least, one valve seat (22, 122).

14. The valve (10, 110) of claim 13, wherein the second valve member (38, 138) and the valve seat (24, 124) belonging to this second valve member (38, 138) are likewise elastically deformable in such a way that both valve members (36, 136 and 38, 138) can be thrust through the valve seats (22, 122 and 24, 124) with in particular external expenditure of force.

15. A valve (10, 110) having a valve chamber (14, 114), having at least one inlet conduit (16, 116) and one outlet conduit (18, 118) branching off from the valve chamber, having a movable lifting rod (34, 134), one end of which opens into an actuator (53), and having at least one valve member (36, 136, 236) secured to the lifting rod (34, 134), and having at least one valve seat (22, 122) cooperating with the valve member (36, 136, 236), characterized in that the valve seat (22, 122) and/or valve member (36, 136, 236) is elastically deformable, and that the elasticity of the valve seat (22, 122) and/or valve member (36, 136, 236) is at least so great that the valve member (36, 136, 236) can be thrust through the valve seat (22, 122) by what is in particular an external exertion of force and subsequently the valve seat (36, 136, 236) and the valve member (22, 122) return to their outset state, wherein a second outlet conduit (20, 120) with an associated valve seat (24, 124) and valve member (38, 138) branches off from the valve chamber (14, 114) of the valve (10, 110).

16. An electromagnetically-actuated valve (10, 110) for water-associated control of the cycle of a heating or cooling system, having a valve chamber (14, 114), having at least one inlet conduit (16, 116) and one outlet conduit (18, 118) branching off from the valve chamber, having a movable lifting rod (34, 134), one end of which opens into an actuator (53), and having at least one valve member (36, 136, 236) secured to the lifting rod (34, 134), and having at least one valve seat (22, 122) cooperating with the valve member (36, 136, 236), characterized in that the valve seat (22, 122) and/or valve member (36, 136, 236) is elastically deformable, and that the elasticity of the valve seat (22, 122) and/or valve member (36, 136, 236) is at least so great that the valve member (38, 136, 236) can be thrust through the valve seat (22, 122) by what is in particular an external exertion of force end subsequently the valve seat (36, 136, 236) and the valve member (22, 122) return to their outset state.

17. An electromagnetically-actuated valve (10, 110) for water-associated control of the cycle of a heating or cooling system, having a valve chamber (14, 114), having at least one inlet conduit (16, 116) and one outlet conduit (18, 118) branching off from the valve chamber, having a movable lifting rod (34, 134), one end of which opens into an actuator (53), and having at least one valve member (36, 136, 236) secured to the lifting rod (34, 134), end having at least one valve seat (22, 122) cooperating with the valve member (38, 136, 236), characterized in that the valve seat (22, 122) and/or valve member (36, 136, 236) is elastically deformable, and that the elasticity of the valve seat (22, 122) end/or valve member (36, 136, 236) is at least so great that the valve member (36, 136, 236) can be thrust through the valve seat (22, 122) by what is in particular an external exertion of force and subsequently the valve seat (36, 136, 236) and the valve member (22, 122) return to their outset state, the at least one valve seat (22, 122) and the associated at least one valve member (36, 136, 236) have a chamfer (58, 158 and 56, 156, 256) relative to the axis of the lifting rod (34, 134), which chamfers correspond to one another.

* * * * *